US 11,072,429 B2

(12) United States Patent
Schwarz et al.

(10) Patent No.: US 11,072,429 B2
(45) Date of Patent: *Jul. 27, 2021

(54) LOW PRESSURE ENVIRONMENTAL CONTROL SYSTEM WITH SAFE PYLON TRANSIT

(71) Applicant: RAYTHEON TECHNOLOGIES CORPORATION, Farmington, CT (US)

(72) Inventors: Frederick M. Schwarz, Glastonbury, CT (US); Gabriel L. Suciu, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 389 days.

This patent is subject to a terminal disclaimer.

(21) Appl. No.: 16/152,929

(22) Filed: Oct. 5, 2018

(65) Prior Publication Data

US 2019/0039740 A1    Feb. 7, 2019

Related U.S. Application Data

(60) Division of application No. 14/998,001, filed on Jul. 7, 2014, now Pat. No. 10,093,424, which is a
(Continued)

(51) Int. Cl.
*B64D 13/06* (2006.01)
*B64D 27/26* (2006.01)
(Continued)

(52) U.S. Cl.
CPC ............ *B64D 13/06* (2013.01); *B64D 27/26* (2013.01); *F02C 6/08* (2013.01); *F02C 7/20* (2013.01);
(Continued)

(58) Field of Classification Search
CPC .... B64D 2013/0618; B64D 2013/0603; B64D 13/06; B64D 27/26; B64D 2027/262; F02K 3/04
(Continued)

(56) References Cited

U.S. PATENT DOCUMENTS 2,871,671 A * 2/1959 Bartlett, Jr. ............ F24F 5/0085
62/172
4,285,466 A * 8/1981 Linscheid .......... G05D 23/1393
165/298
(Continued)

FOREIGN PATENT DOCUMENTS

CA    1014870 A    8/1977
CA    2850665 A1    4/2013
(Continued)

OTHER PUBLICATIONS

Extended European Search Report for Application No. 18168856.5 dated Jul. 3, 2018.
(Continued)

*Primary Examiner* — Christopher P Ellis
(74) *Attorney, Agent, or Firm* — Carlson, Gaskey & Olds, P.C.

(57) ABSTRACT

A disclosed gas turbine engine includes a fan section delivering air into a compressor section. An environmental control system includes a higher pressure tap at a higher pressure location in the compressor section, and a lower pressure tap at a lower pressure location. The lower pressure tap communicates to a first passage leading to a downstream outlet, and having a second passage leading into a compressor section of a turbocompressor. The higher pressure tap leads into a turbine section of the turbocompressor such that air in the higher pressure tap drives the turbine section to in turn drive the compressor section of the turbocompressor. A combined outlet of the compressor section and the turbine
(Continued)

section of the turbocompressor intermixes and passes downstream to be delivered to an aircraft use.

13 Claims, 3 Drawing Sheets

Related U.S. Application Data continuation-in-part of application No. 13/345,793, filed on Jan. 9, 2012, now Pat. No. 8,904,805.

(51) Int. Cl.
  *F02K 3/04* (2006.01)
  *F02C 6/08* (2006.01)
  *F02C 7/20* (2006.01)
(52) U.S. Cl.
  CPC ........ *F02K 3/04* (2013.01); *B64D 2013/0603* (2013.01); *B64D 2013/0618* (2013.01); *B64D 2027/262* (2013.01)
(58) Field of Classification Search
  USPC .......................................................... 244/54
  See application file for complete search history.

(56) References Cited

U.S. PATENT DOCUMENTS

| | | | |
|---|---|---|---|
| 4,644,780 A | 2/1987 | Jeter | |
| 5,137,230 A * | 8/1992 | Coffinberry | B64D 13/06 244/118.5 |
| 5,143,329 A * | 9/1992 | Coffinberry | B64C 21/00 244/209 |
| 5,351,473 A * | 10/1994 | Shuba | F01D 17/105 60/782 |
| 6,412,270 B1 * | 7/2002 | Mortzheim | F01D 11/04 415/144 |
| 6,647,730 B2 * | 11/2003 | Liu | F01D 25/12 60/782 |
| 7,305,842 B1 * | 12/2007 | Schiff | B64D 13/06 62/244 |
| 7,607,308 B2 * | 10/2009 | Kraft | F02C 6/08 60/226.1 |
| 7,785,066 B2 * | 8/2010 | Bil | F04D 27/0215 415/145 |
| 8,276,392 B2 * | 10/2012 | Van Der Woude | B64D 33/10 60/785 |
| 8,904,805 B2 * | 12/2014 | Hipsky | B64D 13/04 60/785 |
| 9,452,841 B2 * | 9/2016 | Richardson | B64D 29/02 |
| 9,650,967 B2 * | 5/2017 | DeFrancesco | F02C 7/185 |
| 10,077,719 B2 * | 9/2018 | Mojem | F02C 9/18 |
| 10,358,221 B2 * | 7/2019 | Sautron | B64D 13/06 |
| 10,393,128 B2 * | 8/2019 | Urac | F04D 27/0215 |
| 10,457,401 B2 * | 10/2019 | Feulner | B64F 1/34 |
| 10,774,752 B2 * | 9/2020 | Suciu | F02C 3/04 |
| 10,794,295 B2 * | 10/2020 | Schwarz | F02C 3/04 |
| 2009/0000305 A1 * | 1/2009 | Porte | F02K 3/075 60/782 |
| 2012/0180509 A1 * | 7/2012 | DeFrancesco | F02C 9/18 62/172 |
| 2012/0216545 A1 * | 8/2012 | Sennoun | B64D 13/06 60/772 |
| 2013/0097992 A1 * | 4/2013 | Suciu | F02C 7/14 60/39.83 |
| 2013/0187007 A1 * | 7/2013 | Mackin | F02C 6/04 244/134 R |
| 2014/0000279 A1 * | 1/2014 | Brousseau | F02C 9/18 60/782 |
| 2014/0050574 A1 * | 2/2014 | Chrabascz | F04D 29/023 415/200 |
| 2015/0360786 A1 * | 12/2015 | Oberpriller | B64D 13/08 165/51 |
| 2016/0010589 A1 * | 1/2016 | Rolt | F01D 13/003 60/226.1 |
| 2016/0090917 A1 * | 3/2016 | Bruno | B64D 13/06 415/145 |

FOREIGN PATENT DOCUMENTS

| | | |
|---|---|---|
| DE | 102005025766 | 1/2007 |
| EP | 2613035 A2 | 7/2013 |

OTHER PUBLICATIONS

European Search Report for EP Application No. 15175737A dated Nov. 20, 2015.

* cited by examiner

LOW PRESSURE ENVIRONMENTAL CONTROL SYSTEM WITH SAFE PYLON TRANSIT

CROSS-REFERENCE TO RELATED APPLICATIONS

This application is a divisional of U.S. patent application Ser. No. 14/998,001 filed on Jul. 7, 2014, which is a continuation-in-part of U.S. application Ser. No. 13/345,793 filed Jan. 9, 2012, now granted as U.S. Pat. No. 8,904,805 issued on Dec. 9, 2014.

BACKGROUND

This application relates to an environmental control system for an aircraft which taps both high and low pressure compressed air for uses on an aircraft.

Environmental control systems are known, and associated with an aircraft. Typically, these systems tap air from a gas turbine engine on the aircraft, and send it to the aircraft cabin, and other air uses on the aircraft.

The systems typically tap low pressure compressed air from a lower pressure compressor location, and higher pressure compressed air from a higher pressure compressor location. The two are utilized at distinct times during the operation of a gas turbine engine, dependent on the needs, and the available air.

In the prior art, when the higher pressure air is tapped, it is at a very high temperature. Thus, cooling of the air must occur. It is typical that some form of intercooler or other heat exchanger is included.

In addition, the higher pressure compressed air has already been compressed beyond the level of the lower pressure compressed air. The more higher pressure compressed air that is diverted away from engine uses, the lower the efficiency of the engine.

SUMMARY

In a featured embodiment, a gas turbine engine includes a fan section delivering air into a compressor section. The compressor section compresses air and delivers air into a combustion section. Products of combustion pass from the combustion section over a turbine section to drive the fan section and main compressor sections. A gearbox is driven by the turbine section to drive the fan section. An environmental control system includes a higher pressure tap at a higher pressure location in the compressor section, and a lower pressure tap at a lower pressure location. The lower pressure location being at a lower pressure than the higher pressure location. The lower pressure tap communicates to a first passage leading to a downstream outlet, and having a second passage leading into a compressor section of a turbocompressor. The higher pressure tap leads into a turbine section of the turbocompressor such that air in the higher pressure tap drives the turbine section to in turn drive the compressor section of the turbocompressor. A combined outlet of the compressor section and the turbine section of the turbocompressor intermixes and passes downstream to be delivered to an aircraft use. A pylon supports the engine. The pylon defines a lowermost surface and the higher pressure tap extends above a plane including the lowermost surface. The higher pressure tap includes a double wall tube above the plane for preventing leakage from impinging on a portion of the pylon.

In another embodiment according to the previous embodiment, includes a pressure sensor disposed in a space between the walls of the double wall tube.

In another embodiment according to any of the previous embodiments, a portion of the turbocompressor extends above the plane of the pylon.

In another embodiment according to any of the previous embodiments, the gearbox provides a gear reduction of at least about 2.0.

In another embodiment according to any of the previous embodiments, the turbine section includes a fan drive turbine that drives the gearbox and one of the main compressor sections.

In another embodiment according to any of the previous embodiments, the compressor section includes a first compressor section and a second compressor section and the first compressor section includes at least four (4) stages and no more than seven (7) stages.

In another embodiment according to any of the previous embodiments, bleed air is taken from at least a fourth stage of the first compressor section.

In another embodiment according to any of the previous embodiments, includes a control valve in fluid communication with an inlet to the compressor of the turbocompressor.

In another featured embodiment, an environmental control system for an aircraft includes a higher pressure tap in communication with a higher pressure location of a main compressor section of an aircraft engine. A lower pressure tap in communication with a lower pressure location of the main compressor section of the aircraft engine. The lower pressure location being at a lower pressure than the higher pressure location. A turbocompressor includes a compressor section driven by a turbine section. The lower pressure tap is in communication with the compressor section of the turbocompressor and the higher pressure tap is in communication with the turbine section of the turbocompressor such that air from the higher pressure tap drives the turbine section to in turn drive the compressor section of the turbocompressor. A combined outlet of the compressor section and the turbine section of the turbocompressor intermixes and passes downstream to be delivered to an aircraft use. A pylon supports the engine. The pylon defines a lowermost surface and the higher pressure tap extends above a plane including the lowermost surface. The tap includes a double wall tube above the plane for preventing leakage from impinging on a portion of the pylon.

In another embodiment according to the previous embodiment, includes a conduit in communication with the lower pressure tap and bypassing the compressor section of the turbocompressor. The conduit includes a check valve controlling airflow through the conduit in a single direction.

In another embodiment according to any of the previous embodiments, includes a pressure sensor disposed within a space between the double wall tube for generating data indicative of a failure of the inner wall of the double wall tube.

In another embodiment according to any of the previous embodiments, a portion of the turbocompressor extends above the plane of the pylon.

In another embodiment according to any of the previous embodiments, includes a control valve disposed between the higher pressure tap and the turbine of the turbocompressor.

In another embodiment according to any of the previous embodiments, includes a control valve disposed between the lower pressure tap and the compressor section of the turbocompressor.

In another embodiment according to any of the previous embodiments, includes a sensor in communication with the turbine of the turbocompressor for generating data indicative of a speed of the turbine.

In another embodiment according to any of the previous embodiments, the turbocompressor includes a brake for controlling a speed of the turbine of the turbocompressor.

In another featured embodiment, a gas turbine engine assembly for an aircraft includes a fan section delivering air into a main compressor section. The main compressor section includes a first compressor section and a second compressor section operating at a higher pressure than the first compressor section. The main compressor section compresses air and delivers air into a combustion section where the air is mixed with fuel and ignited to generate products of combustion that are passed over a turbine section to drive the fan section and main compressor sections. An environmental control system includes a low pressure tap at a location on the first compressor section of the main compressor section. The low pressure tap communicates airflow to a first passage leading to a downstream outlet and into a third compressor. A combined outlet intermixes airflow from the first passage and from the third compressor and passing the airflow downstream to be delivered to an aircraft use.

In another embodiment according to the previous embodiment, the main compressor includes a low pressure compressor including a plurality of stages and the low pressure tap is disposed after a fourth stage of the low pressure compressor.

In another embodiment according to any of the previous embodiments, the low pressure tap is disposed before a seventh stage of the low pressure compressor.

Although the different example have specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
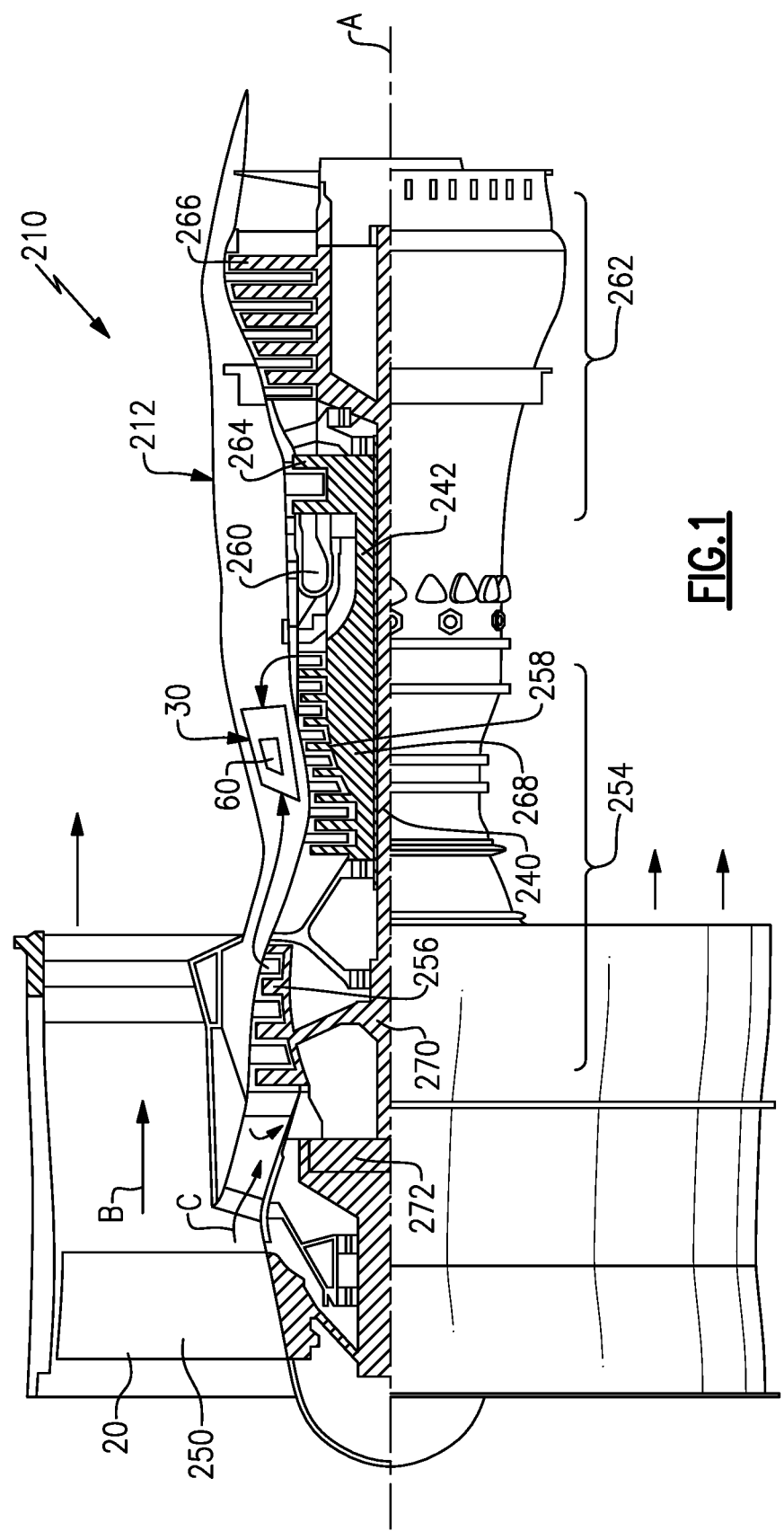
FIG. 1 schematically shows an embodiment of a gas turbine engine.

A gas turbine engine 210 is shown in FIG. 1. As shown, the engine 210 includes a fan 250 (which includes a plurality of fan blades 20), a main compressor section 254 (which includes both a low pressure compressor 256 and a high pressure compressor 258), a combustor 260, and a turbine section 262 (which includes both a high pressure turbine 264 and a low pressure turbine 266). The high pressure compressor 258 is driven, via a first spool 268, by the high pressure turbine 264. The low pressure compressor 256 is driven, via a second spool 270, by the low pressure turbine 266. Also driven by the low pressure turbine 266 are the fan blades 20 of the fan 250, which is coupled to the second spool 270 via a geared architecture 272.

The fan section 250 drives air along a bypass flow path B while the compressor section 254 draws air in along a core flow path C where air is compressed and communicated to a combustor section 260. In the combustor section 260, air is mixed with fuel and ignited to generate a high pressure exhaust gas stream that expands through the turbine section 262 where energy is extracted and utilized to drive the fan section 250 and the compressor section 254.

The second spool 270 generally includes an inner shaft 240 that connects the fan 250 and the low pressure (or first) compressor section 256 to a low pressure (or first) turbine section 266. The inner shaft 240 drives the fan 250 through a speed change device, such as the geared architecture 272, to drive the fan 250 at a lower speed than the low speed spool 270. The high-speed spool 268 includes an outer shaft 242 that interconnects the high pressure (or second) compressor section 258 and the high pressure (or second) turbine section 264. The inner shaft 240 and the outer shaft 242 are concentric and rotate via the bearing systems disposed about the engine central longitudinal axis A.

The disclosed gas turbine engine 210 in one example is a high-bypass geared aircraft engine. In a further example, the gas turbine engine 210 includes a bypass ratio greater than about six (6), with an example embodiment being greater than about ten (10). The example geared architecture 272 is an epicyclical gear train, such as a planetary gear system, star gear system or other known gear system, with a gear reduction ratio of greater than about 2.0.

In one disclosed embodiment, the gas turbine engine 210 includes a bypass ratio greater than about ten (10:1) and the fan diameter is significantly larger than an outer diameter of the low pressure compressor 256. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 250 of the engine 210 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example low pressure compressor section 256 is driven by the low pressure turbine 266 also referred to as the fan drive turbine as it drives the fan 250 through the geared architecture 272. The example low pressure compressor section 256 includes at least 4 stages. In one disclosed embodiment the low pressure compressor 256 includes seven (7) stages. In another disclosed embodiment the low pressure compressor includes at least four (4) and up to seven (7) stages.

An environmental control system 30 for use on an aircraft receives air from portions of the compressor 254. In this example, the ECS system 30 receives air from a portion of the low pressure compressor 256 and the high pressure compressor 258. A turbocompressor 60 (described below) is utilized to increase air pressure as required for operation specific requirements.

Figure 2:
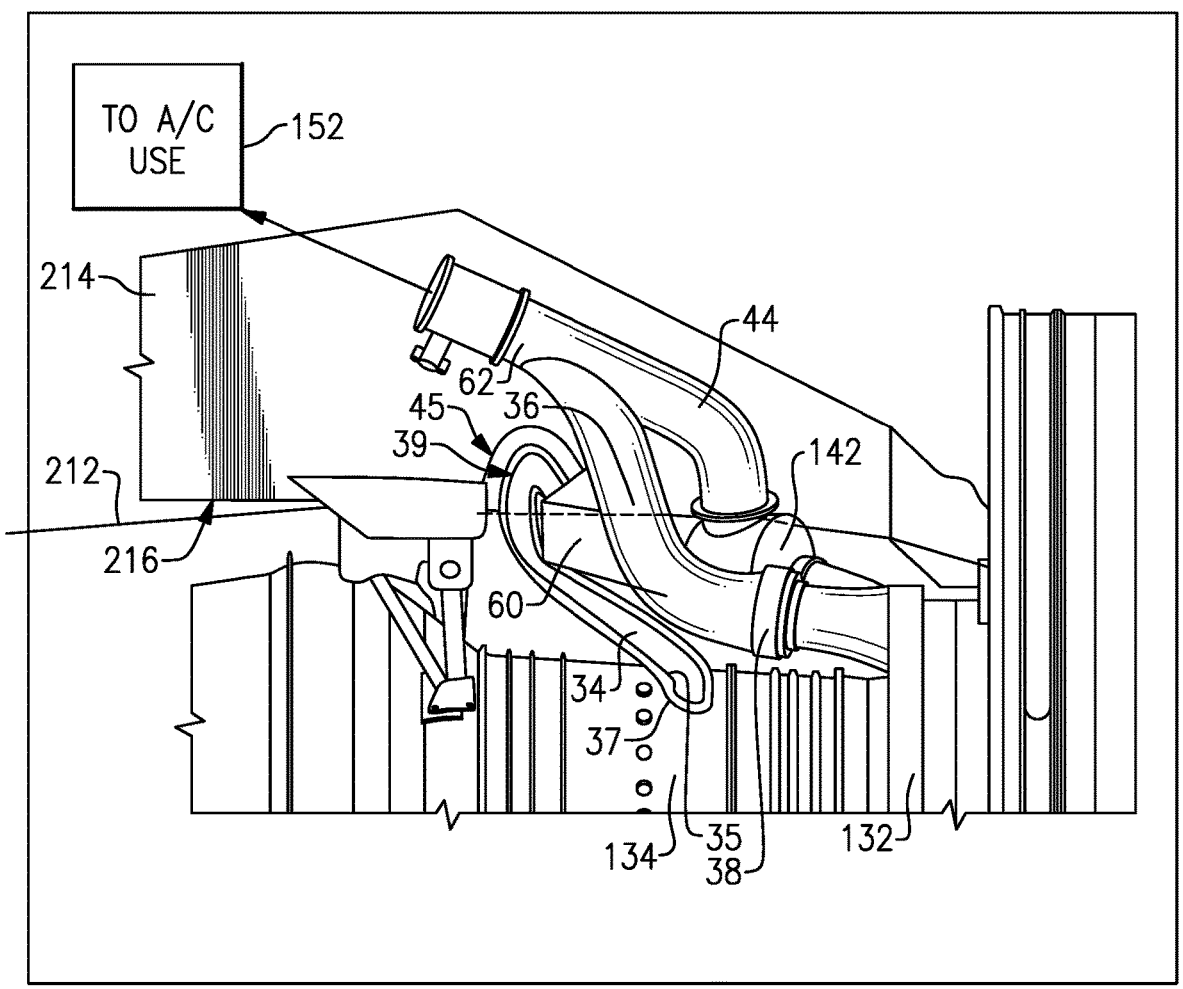
FIG. 2 shows an embodiment of an environmental control system for an aircraft.

Referring to FIG. 2 with continued reference to FIG. 1, the ECS 30 for use on an aircraft is illustrated. A high pressure compression location 134 has a tap 34 as shown in FIG. 2. Another tap 32 is at a lower pressure location 132. Locations 132 and 134 may both be within the high pressure compressor 258 or one may be in the lower pressure compressor section 256. However, the tap 34 is downstream of the tap 32, and at a higher pressure location.

The compressor section 254, combustor 260 and the turbine section 262 are disposed within a core cowling schematically indicated at 212. The core cowling 212 is disposed about the core engine features. The engine 210 is supported on an aircraft by a pylon 214 (shown in FIG. 2) that defines a lowermost surface 216 also referred to as a plane. The lower plane 216 is the lowest extent of the pylon 214 toward the engine 210. The example ECS 30 including turbocompressor 60 is disposed outside the engine cavity defined within the core cowling 212, and below and/or adjacent to the pylon 214. The tap 34 from the higher pressure compressor section 258 extends above the lower plane 216 of the pylon 214 and includes a double wall configuration. The double wall configuration protects against leakage of high temperature, high pressure air from the higher pressure compressor section 258 from impinging on portions of the pylon 214.

The example tap 34 includes an inner tube 35 (shown in FIG. 3) that defines the conduit for the higher pressure and temperature air from the higher pressure compressor section 256. An outer tube 37 provides protection against potential leakage through the inner tube 35. In one example, a sensor 39 is provided within the space between the inner tube 35 and the outer tube 37 to detect leakage. The sensor 39 may provide information indicative of a pressure and/or temperature with the space between the inner tube 35 and the outer tube 37. In one disclosed embodiment the sensor 39 measures a pressure such that an increase in pressure would is indicative of a possible leakage. If a leakage is detected, the turbocompressor 60 can be shutdown and air from the higher pressure compressor 258 discontinued, thereby safeguarding against damage to the pylon 214. Additionally, a heat shield 45 may be included to further protect against impingement of high pressure and temperature air against the pylon 214.

Figure 3:
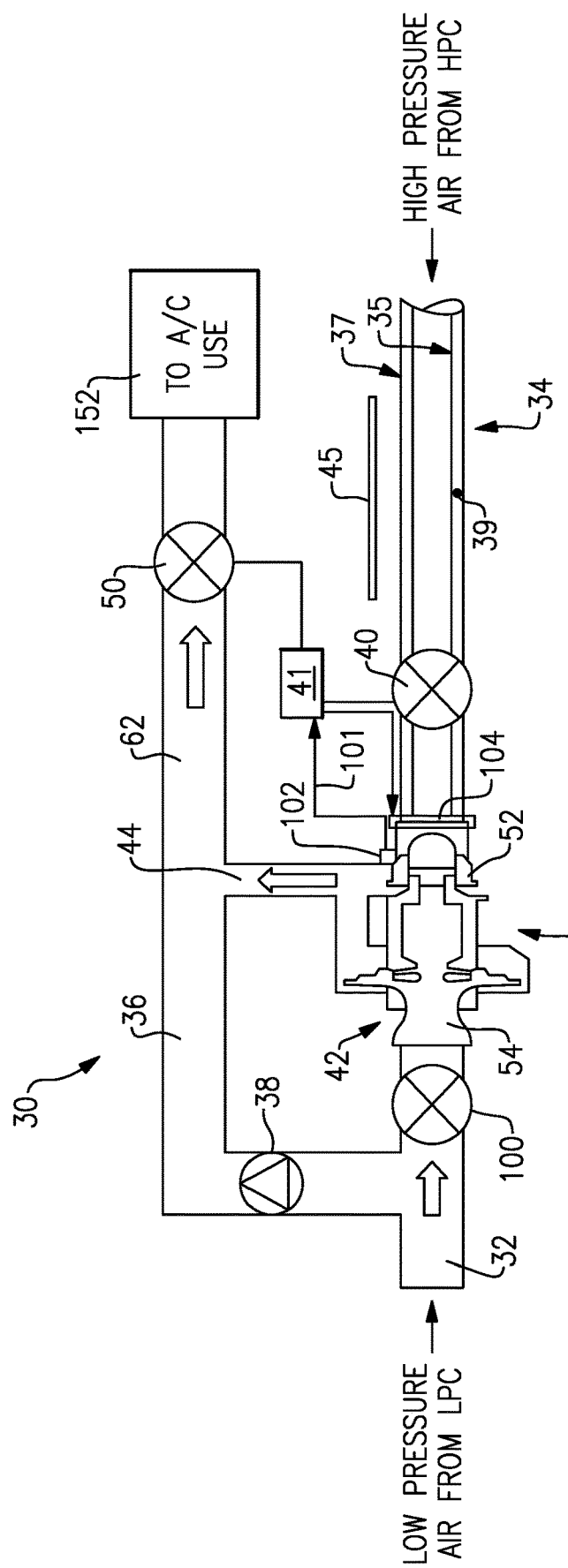
FIG. 3 shows a schematic of the FIG. 2 system.

Referring to FIG. 3 with continued reference to FIG. 2, the tap 32 leads to a first passage 36 having a check valve 38, and also into the compressor section 54 of the turbocompressor 60. The high pressure tap 34 leads into a turbine section 52 of the turbocompressor 60. The exits of both compressor section 54 and turbine section 52 of turbocompressor 60 pass into a common outlet 44.

The outlet 44 merges with the first passage 36 and both pass through a valve 50 in a combined outlet 62 leading to an aircraft use 152.

As shown in FIG. 3, the tap 32 alternatively leads to compressor section 54 or into first passage 36 leading to the combined outlet 62. Check valve 38 allows flow from tap 32 to the first passage 36 in a single direction. It also provides some resistance to flow in that direction. The tap 34 leads through a modulating and shutoff valve 40 which can be opened or closed by a controller 41, shown schematically. Air from the higher compressed location at tap 34 is expanded across the turbine section 52 into the outlet 44. In one example higher pressure air is provided from the high pressure compressor 258 to the tap 34.

The high pressure and temperature air drives the turbine section 52 that drives the compressor section 54 to compress the air from the tap 32, and increase its pressure. Outlets from the turbine section 52 and the compressor section 54 mix in outlet 44, and pass to the combined outlet 62. When the compressor section 54 is being driven by the turbine section 52, there is suction applied to the tap 32 and the first passage 36, and thus check valve 38 will remain closed.

In one example, bleed air is taken from a fourth stage of the low pressure compressor 256 and fed to the tap 32. The air from the tap 32 is used generally exclusively under certain conditions when the heat to be rejected is at a maximum. As an example, the air will tend to pass from tap 32 through the check valve 38 to the first passage 36 during climb and cruise. At such times, the valve 40 is maintained closed to limit the diversion of compressed air.

However, under certain conditions, as an example a descent, the valve 40 is opened and the turbine section 52 is driven. Airflow from tap 32 passes to the compressor section 54. Expanding high pressure and temperature air from the tap 34 through the compressor section 54 lowers the temperature of air passed to the outlet 44. Further, mixing it with the lower pressure compressed air 32, even when compressed to a higher pressure by compressor section 54, may eliminate the need for a separate heat exchanger on the outlet 44. The intermixed air may be at a useful temperature when it reaches the combined outlet 62. The amount of air from the two taps can be varied to achieve a desired pressure and temperature of airflow communicated to the aircraft use 152.

A control valve 50 may be closed if the valve 40 fails. At such times, it may be more desirable to supply no air to the system 152, then to have an open diversion from the tap 34.

A valve 100 is provided after the tap 32 and prior to the compressor section 54 and is controlled by the controller 41. The valve 100 is actuated to close off flow from the low pressure compressor 256 to control and modulate low pressure airflow into the compressor 54.

A sensor 102 is provided that generates data indicative of turbine speed that is sent by way of communication line 101 to the controller 41. The sensor 102 is configured to provide information indicative of a turbine overspeed condition. The controller 41 will actuate, and/or close valves 100, 40 and 50 in a desired combination to prevent damage to the system. In one example, the controller 41 will receive information from the sensor 102 indicative of the onset, or actual overspeed condition of the turbine 52. The controller 41 utilizes at least data from the sensor 102, along with other data available of engine operation to recognize a current or potential turbine speed condition that warrants shutdown or other remedial actions. The controller 41 may close the valve 40 to prevent flow of high pressure air that drives the turbine 52. A brake 104 may also be employed to shut down the turbine 52 if an overspeed condition or other undesirable operating condition is detected or indicated.

The elimination of a required heat exchanger, and the use of less air from the higher compression location, is particularly valuable when combined with a system incorporating a gear drive for the turbo fan, such as shown at 272 in FIG. 1.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A gas turbine engine assembly for an aircraft comprising:
   a fan section delivering air into a main compressor section, said main compressor section including a first compressor section and a second compressor section operating at a higher pressure than the first compressor section, said main compressor section compressing air and delivering air into a combustion section where the air is mixed with fuel and ignited to generate products of combustion that are passed over a turbine section to drive said fan section and main compressor sections;
   an environmental control system including a low pressure tap at a location on the first compressor section of the main compressor section, wherein the low pressure tap is upstream of a higher pressure tap and communicates airflow to a first passage leading to a downstream outlet and into a third compressor; and
   a combined outlet intermixing airflow from the first passage and from the third compressor and passing the airflow downstream to be delivered to an aircraft use.

2. The gas turbine engine assembly as recited in claim 1, wherein a pylon supporting the engine on the aircraft, wherein the pylon defines a lowermost surface and the higher pressure tap extends above a plane including the lowermost surface, wherein the higher pressure tap comprises a double wall tube above the plane for preventing leakage from impinging on a portion of the pylon.

3. The gas turbine engine assembly as recited in claim 1, wherein the main compressor includes a low pressure compressor including a plurality of stages and the low pressure tap is disposed after a fourth stage of the low pressure compressor.

4. The gas turbine engine assembly as recited in claim 3, wherein the low pressure tap is disposed before a seventh stage of the low pressure compressor.

5. The gas turbine engine as recited in claim 4, wherein the fan section is driven through a gearbox, wherein the gearbox provides a gear reduction of at least about 2.0.

6. The gas turbine engine as recited in claim 5, wherein the turbine section includes a fan drive turbine that drives the gearbox and one of the main compressor sections.

7. The gas turbine engine as recited in claim 6, wherein the compressor section includes a first compressor section and a second compressor section and the first compressor section includes at least four (4) stages and no more than seven (7) stages.

8. The gas turbine engine as recited in claim 7, wherein bleed air is taken from at least a fourth stage of the first compressor section.

9. The gas turbine engine as recited in claim 1, wherein the higher pressure tap leads into a turbine section of a turbocompressor and the lower pressure tap leads onto a compressor of the turbocompressor, wherein the air from the higher pressure tap drives the turbine section to in turn drive the compressor of the turbocompressor.

10. The gas turbine engine as recited in claim 9, including a control valve in fluid communication with an inlet to the compressor of the turbocompressor.

11. A gas turbine engine assembly for an aircraft comprising:
    a fan section delivering air into a main compressor section, said main compressor section including a first compressor section and a second compressor section operating at a higher pressure than the first compressor section, said main compressor section compressing air and delivering air into a combustion section where the air is mixed with fuel and ignited to generate products of combustion that are passed over a turbine section to drive said fan section and main compressor sections;
    an environmental control system including a low pressure tap at a location on the first compressor section of the main compressor section, wherein the low pressure tap communicates airflow to a first passage leading to a downstream outlet and into a third compressor; and
    a combined outlet intermixing airflow from the first passage and from the third compressor and passing the airflow downstream to be delivered to an aircraft use.

12. The gas turbine engine assembly as recited in claim 11, wherein the main compressor includes a low pressure compressor including a plurality of stages and the low pressure tap is disposed after a fourth stage of the low pressure compressor.

13. The gas turbine engine assembly as recited in claim 12, wherein the low pressure tap is disposed before a seventh stage of the low pressure compressor.

* * * * *